United States Patent
Young et al.

(10) Patent No.: US 12,520,185 B2
(45) Date of Patent: Jan. 6, 2026

(54) UPLINK ERROR RATE

(71) Applicant: MaxLinear, Inc., Carlsbad, CA (US)

(72) Inventors: Neville Leslie Young, Glenwood (AU); Chiayi Huang, Sydney (AU)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 18/676,124

(22) Filed: May 28, 2024

(65) Prior Publication Data
US 2024/0314616 A1    Sep. 19, 2024

Related U.S. Application Data

(63) Continuation of application No. 18/296,753, filed on Apr. 6, 2023, now Pat. No. 11,997,525, which is a continuation of application No. 17/320,068, filed on May 13, 2021, now Pat. No. 11,653,244.

(51) Int. Cl.
| | |
|---|---|
| *H04W 24/10* | (2009.01) |
| *H04L 5/00* | (2006.01) |
| *H04L 43/0823* | (2022.01) |
| *H04L 43/0829* | (2022.01) |
| *H04W 72/21* | (2023.01) |

(52) U.S. Cl.
CPC ......... *H04W 24/10* (2013.01); *H04L 5/0007* (2013.01); *H04L 43/0835* (2013.01); *H04L 43/0847* (2013.01); *H04W 72/21* (2023.01)

(58) Field of Classification Search
CPC . H04W 24/10; H04W 72/0413; H04W 72/12; H04W 76/00; H04W 72/04; H04L 43/0847; H04L 5/0007

USPC .......................................................... 370/329
See application file for complete search history.

(56) References Cited

U.S. PATENT DOCUMENTS

| | | | |
|---|---|---|---|
| 8,300,716 B1 * | 10/2012 | Lee ....................... | H04W 24/08 |
| | | | 375/259 |
| 8,432,863 B2 | 4/2013 | Chuang et al. | |
| 9,661,523 B1 * | 5/2017 | Tamhane .......... | H04W 56/0065 |
| 11,202,297 B2 * | 12/2021 | Vlachou ........... | H04W 28/0236 |
| 11,653,244 B2 | 5/2023 | Young et al. | |
| 11,997,525 B2 | 5/2024 | Young et al. | |
| 2007/0258383 A1 | 11/2007 | Wada | |
| 2011/0235593 A1 | 9/2011 | Gong et al. | |
| 2012/0026908 A1 * | 2/2012 | Tzannes .................. | H04L 41/12 |
| | | | 370/252 |
| 2012/0314569 A1 * | 12/2012 | Liu ..................... | H04W 36/304 |
| | | | 370/252 |
| 2012/0314600 A1 * | 12/2012 | Zeira ..................... | H04W 72/20 |
| | | | 370/252 |

(Continued)

OTHER PUBLICATIONS

Notice of Allowance for U.S. Appl. No. 18/296,753, dated Jan. 24, 2024, 09 pages.

*Primary Examiner* — Robert J Lopata
(74) *Attorney, Agent, or Firm* — Buchalter; Jason W. Croft

(57) ABSTRACT

An example method may include determining a multi-user packet error rate associated with communications from a client device to a host device, the multi-user packet error rate based on a number of packets in a multi-user communication frame with an error. The method may also include sending a trigger from the host device to the client device to communicate via a second multi-user communication frame, the trigger identifying a transfer rate based on the multi-user packet error rate.

12 Claims, 15 Drawing Sheets

(56) References Cited

U.S. PATENT DOCUMENTS

| | | | | |
|---|---|---|---|---|
| 2014/0211642 A1* | 7/2014 | Du | ............... | H04B 7/0689 |
| | | | | 370/252 |
| 2014/0219111 A1* | 8/2014 | Du | ............... | H04L 1/0033 |
| | | | | 370/252 |
| 2014/0269644 A1* | 9/2014 | Wang | ............ | H04L 1/0004 |
| | | | | 370/338 |
| 2014/0269964 A1* | 9/2014 | Du | ............... | H04L 1/1685 |
| | | | | 375/267 |
| 2015/0003261 A1* | 1/2015 | Silverman | ............ | H04L 1/203 |
| | | | | 370/252 |
| 2015/0351048 A1* | 12/2015 | Li | ............ | H04W 52/0245 |
| | | | | 455/574 |
| 2016/0345343 A1* | 11/2016 | Elsherif | ............ | H04B 7/0689 |
| 2017/0111811 A1* | 4/2017 | Szymanik | ............ | H04W 74/06 |
| 2017/0201439 A1* | 7/2017 | Yang | ............... | H04L 5/006 |
| 2017/0302401 A1* | 10/2017 | Gao | ............ | H04B 7/0452 |
| 2018/0091257 A1* | 3/2018 | Steele | ............ | H04L 1/0003 |
| 2018/0227108 A1* | 8/2018 | Zhu | ............ | H04B 17/373 |
| 2018/0337713 A1* | 11/2018 | Elsherif | ............ | H04B 7/0634 |
| 2019/0305875 A1* | 10/2019 | Xue | ............ | H04L 1/0003 |
| 2020/0022157 A1* | 1/2020 | Min | ............ | H04W 72/54 |
| 2020/0336922 A1* | 10/2020 | Zhao | ............ | H04W 24/02 |
| 2021/0211921 A1* | 7/2021 | Swartz | ............ | H04L 41/0816 |
| 2021/0250133 A1* | 8/2021 | Chun | ............... | H04L 1/00 |
| 2021/0400500 A1* | 12/2021 | Zhang | ............ | H04W 24/02 |
| 2022/0141132 A1* | 5/2022 | Byrne | ............ | H04L 45/124 |
| | | | | 370/252 |
| 2022/0337986 A1* | 10/2022 | Cheong | ............ | H04W 76/15 |

\* cited by examiner

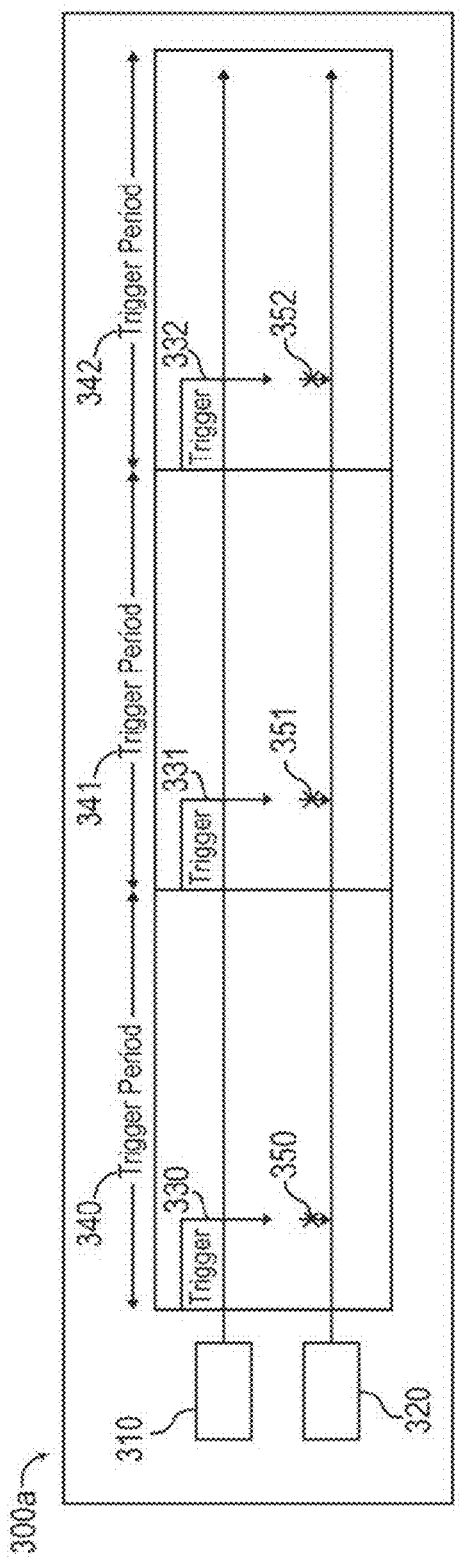
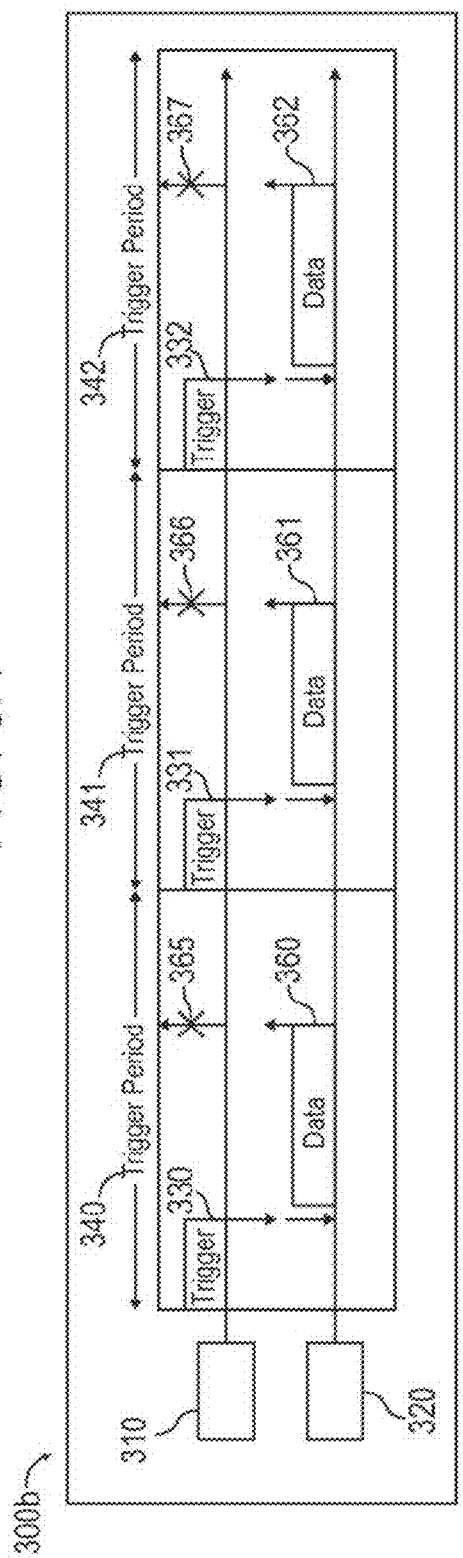
FIG. 3A
FIG. 3B

UPLINK ERROR RATE

RELATED APPLICATION

This application is a continuation of U.S. patent application Ser. No. 18/296,753, filed Apr. 6, 2023, which is a continuation of U.S. patent application Ser. No. 17/320,068, filed May 13, 2021, the disclosures of which are incorporated herein by reference in their entireties.

FIELD

The implementations discussed herein are related to deriving an uplink error rate.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax", "ay", "be". Communications follow a hub and spoke model with a WAP at the hub and the spokes corresponding to the wireless links to each 'client' device or station (STA) utilizing the WLAN.

However, when packets are transmitted from a client to the WAP, some circumstances lead to inefficient or incomplete information to provide a rate via which the packets are sent in the uplink direction to the WAP.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to determination of an uplink error rate. Some implementations provide a method, system, and/or apparatus to facilitate determining the uplink error rate.

One or more implementations may include an example method that includes determining a multi-user packet error rate associated with communications from a client device to a host device, the multi-user packet error rate based on a number of packets in a multi-user communication frame with an error. The method may also include sending a trigger from the host device to the client device to communicate via a second multi-user communication frame, the trigger identifying a transfer rate based on the multi-user packet error rate.

The present disclosure may be implemented in hardware, firmware, or software. Associated devices and circuits are also claimed. Additional features and advantages of the present disclosure will be set forth in the description which follows, and in part will be obvious from the present disclosure, or may be learned by the practice of the present disclosure. The features and advantages of the present disclosure may be realized and obtained by means of the instruments and combinations particularly pointed out in the appended claims. These and other features of the present disclosure will become more fully apparent from the following description and appended claims or may be learned by the practice of the present disclosure as set forth hereinafter.

BRIEF DESCRIPTION OF THE DRAWINGS

Example implementations will be described and explained with additional specificity and detail through the use of the accompanying drawings in which:

FIGS. 3A-3C illustrate a series of communications between a client device and a host device in various circumstances, described according to at least one implementation of the present disclosure.

DETAILED DESCRIPTION OF SOME EXAMPLE IMPLEMENTATIONS

Implementations described herein may generally include an advanced approach to determining statistics related to an uplink error rate when communicating using a multi-user communication frame, such as an orthogonal frequency division multiple access (OFDMA) frame. For example, a host device with which client devices may be communicating may intelligently determine a packet error rate for packets that are attributable to the multi-user communication frame. The host device may utilize the determined packet error rate that is attributable to the multi-user communication frame to adjust the rate at which future client devices are instructed to communicate with the host device in a multi-user communication frame. For example, if the packet error rate for the multi-user communication frame communications is high, the host device may decrease the rate at which client devices are instructed to communicate in a next trigger frame broadcast to the client devices, while if the packet error rate is low, the host device may increase the rate at which client devices are instructed to communicate in the next trigger frame. In these and other implementations, the host device may communicate the updated rate via a trigger frame instructing client devices to communicate with the host device via a multi-user communication frame, such as an uplink (UL) OFDMA frame, at the updated rate.

By using one or more of the principles of the present disclosure to determine and utilize a packet error rate attributable to multi-user communication frames, network performance may be improved. For example, a host device may be able to balance throughput and robustness by monitoring the packet error rate in multi-user communication frames and intelligently selecting the rate for communications in future uplink multi-user communication frames in a way to increase robustness for circumstances with high packet error rates while increasing throughput for low packet error rates. Such improvements may reduce overall network traffic as lost or degraded packets may not have to be resent, and throughput can be increased when connections are strong.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

Figure 1:
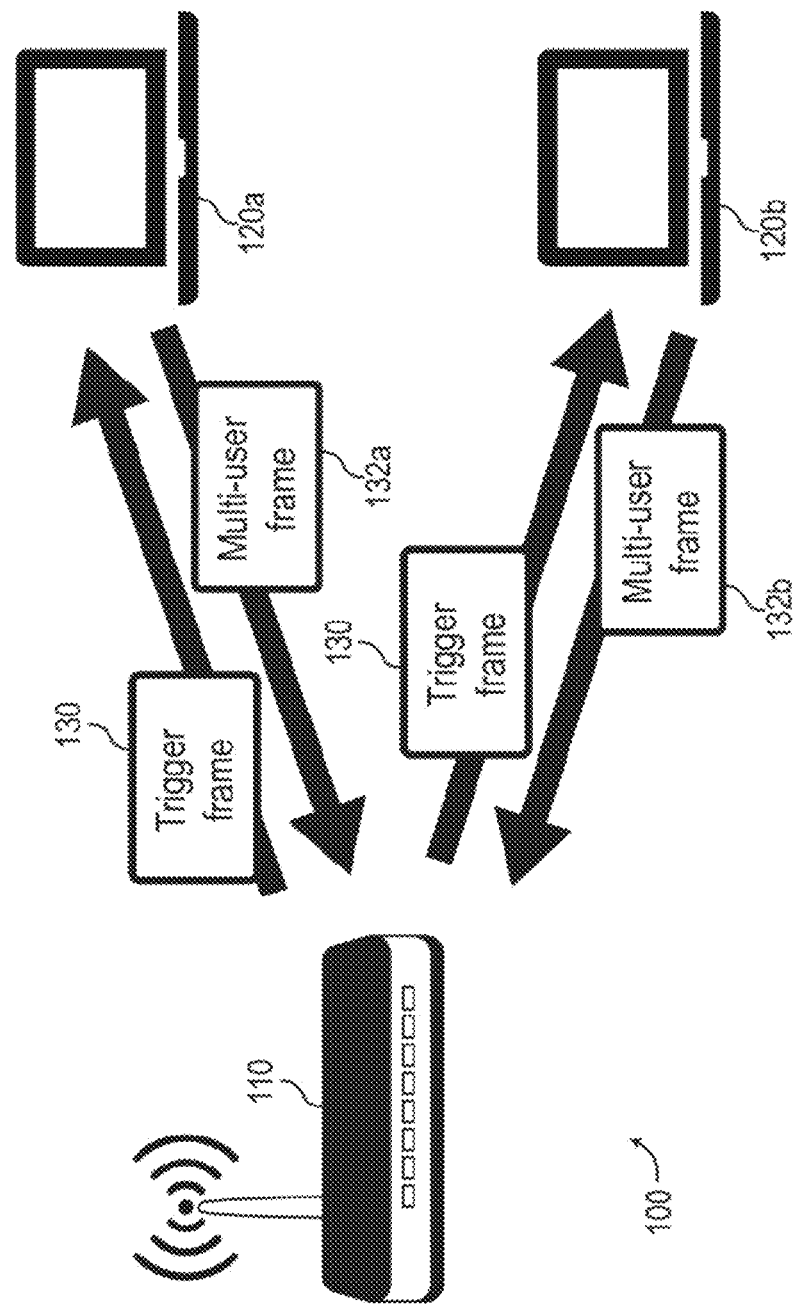
FIG. 1 illustrates an example environment within which an uplink error rate may be determined, including communications between an access point and one or more stations to facilitate determination of the uplink error rate, described according to at least one implementation of the present disclosure.

FIG. 1 illustrates an example environment 100 within which an uplink error rate may be determined, including communications between a host device (such as an access point 110) and one or more client devices (such as stations 120a and 120b) to facilitate determination of the uplink error rate, in accordance with one or more implementations of the present disclosure. For simplicity, the environment is illustrated with one access point (AP), the AP 110, and two stations, the stations 120a and 120b, although it will be appreciated that the principles of the present disclosure are applicable to any number of APs communicating with any number of stations. Within the environment 100, the AP 110 and the stations 120a and 120b may wirelessly communicate with each other.

In operation, the AP 110 may send an initial trigger (such as a trigger frame 130) to cause the stations 120a and 120b to send data in an uplink direction from the stations 120a and 120b to the AP 110 in a multi-user communication frame 132, such as an uplink (UL) OFDMA frame. The multi-user communication frame 132 may include portions of the multi-user communication frame 132a from the first station 120a and portions of the multi-user communication frame 132b from the second station 120b. Based on packets received and/or not received during the multi-user communication frame 132 associated with the initial trigger 130 and/or communications proximate the multi-user communication frame (such as prior to or after the multi-user communication frame), the AP 110 may determine a packet error rate that is attributable to multi-user communication frames 132 (e.g., a multi-user packet error rate). The AP 110 may utilize the multi-user packet error rate to adjust the rate in a later trigger 130 such that later uplink communications from the stations 120a and 120b may be at the adjusted rate. By doing so, the AP 110 may intelligently select a rate to be included in a trigger 130 for multi-user communication frames in an uplink direction from the stations 120a and 120b to the AP 110.

In determining whether or not given missed packets or other potential errors are attributable to a multi-user communication frame 132 (and accordingly are to be counted towards the multi-user packet error rate) may vary based on a variety of circumstances. The present disclosure includes a series of example circumstances and the manner in which the AP 110 may determine, in those circumstances, whether or not the missed packets or other potential errors are attributable to the multi-user communication frame 132. The example circumstances are illustrated and explained with reference to FIGS. 2A-2H, 3A-3C, and/or FIGS. 5-12.

In some implementations, the frequency with which the AP 110 adjusts the rate for future trigger frames 130 may be variable. For example, in one mode of operation, the AP 110 may adjust the rate for future triggers 130 every few seconds or few minutes (e.g., every 5 seconds, every 10 seconds, every 30 seconds, every minute, every 2 minutes, every 3 minutes, etc.). In some implementations, a triggering event may cause the AP 110 to shift into a discovery mode in which the AP 110 may operate to find an ideal rate. For example, if a certain number of errors occur, or a certain number of total failures occur (e.g., trigger periods in which no packets are received), the AP 110 may shift into the discovery mode of operation. In the discovery mode of operation, the AP 110 may modify the rate on an accelerated schedule, such as every half second, or before the transmission of each trigger frame 130, etc. In these and other implementations, a rolling average of current and/or previous multi-user packet error rates may be used by the AP 110 in determining the rate to include in a given trigger frame 130. In some implementations, the rate may be one minus the determined multi-user packet error rate (such as the averaged multi-user packet error rate). In some implementations, the frequency with which the AP 110 adjusts the rate may vary based on the stability of previous determinations of the rate. For example, if a threshold number of successive rates are the same, the frequency with which future rates are determined may be made less frequent. As another example, if there is a certain amount of variability between two or more determined rates, the frequency with which future rates are determined may be made more frequent.

Modifications, additions, or omissions may be made to the environment 100 without departing from the scope of the present disclosure. For example, the designations of different elements in the manner described is meant to help explain concepts described herein and is not limiting. Further, the environment 100 may include any number of other elements or may be implemented within other systems or contexts than those described. For example, any number of APs 110 and/or stations 120 may be included.

Additionally, the teachings are applicable to any type of wireless communication system. For example, while stations and access points are described for one context of wireless communication, the teachings of determining packet error rates for multi-user communications are also applicable to other wireless communication such as Bluetooth®, Bluetooth Low Energy, Zigbee®, Thread, mmWave, etc.

FIGS. 2A-2H illustrate a series of example sets of packets 210 and 211 communicated from a client device to a host device in various circumstances 200a-200h, in accordance with one or more implementations of the present disclosure.

Figure 2A:
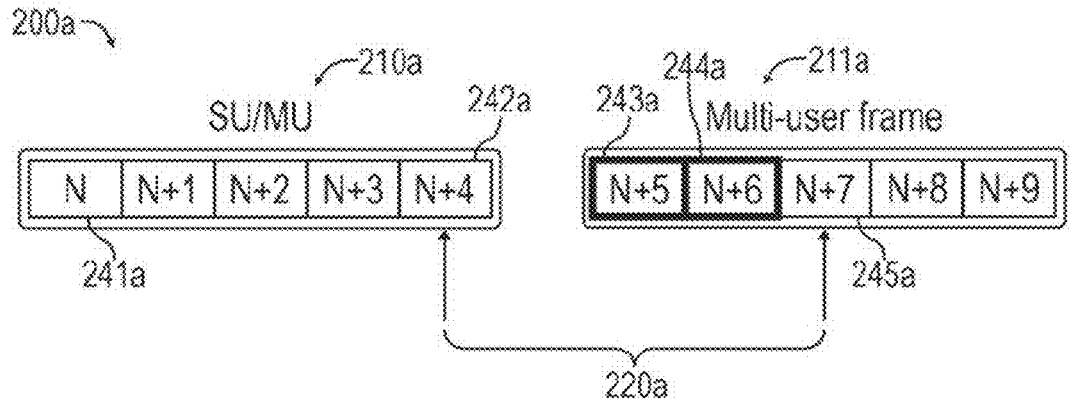
FIGS. 2A-2H illustrate a series of example sets of packets communicated from a client device to a host device in various circumstances, described according to at least one implementation of the present disclosure.

FIG. 2A illustrates a circumstance 200a in which a first protocol data unit (PDU) 210a of packets includes a series of packets communicated via a single-user uplink transmission or generically from multiple users in uplink transmissions, with a first packet 241a and a last packet 242a. The circumstance 200a also includes a second set of packets as a multi-user communication frame 211a. As illustrated in FIG. 2A, a gap 220a of dropped packets may exist that includes packets 243a and 244a. The first received packet of the multi-user communication frame 211 a may include the packet 245a.

In operation, an access point or other host device may monitor a sequence number of received packets. For example, as illustrated in FIG. 2A, the access point may note that after receiving the packet 242a (N+4), the next received packet, the packet 245a, may include a sequence number (N+7) that indicates that a gap exists. In these and other implementations, the access point may recognize that the gap in the sequence begins within a time window identified as corresponding to the multi-user communication frame 211a as communicated in a trigger signal that corresponds to the multi-user communication frame 211a. Additionally or alternatively, the packet 242a may indicate that it is the last packet in the set 210a. In these and other implementations, the number of packets dropped may be identified (e.g., by identifying the size of the gap 220a), and the entire gap 220a may be attributable as error packets associated with the multi-user communication frame 211a. For example, because no packets are received indicating the start of the multi-user communication frame 211a (e.g., the packet 243a with such an indicator is not received) and the gap 220a occurs during the time frame designated as belonging to the multi-user communication frame 211a, all of the packets in the gap 220a may be attributed to the multi-user communication frame 211a in determining the multi-user packet error rate.

Figure 2B:
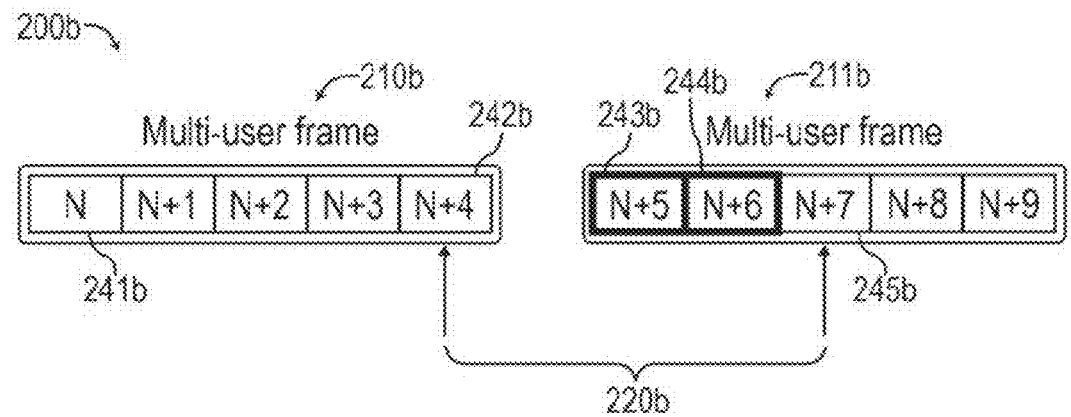

FIG. 2B illustrates a circumstance 200b in which a first PDU 210a of packets includes a series of packets communicated as a first multi-user communication frame 210b, with a first packet 241b and a last packet 242b. The circumstance 200b also include a second set of packets as a second multi-user communication frame 211b. As illustrated in FIG. 2B, a gap 220b of dropped packets may exist that includes packets 243b and 244b. The first received packet of the second multi-user communication frame 211b may include the packet 245b.

In operation, an access point or other host device may monitor a sequence number of received packets. For example, as illustrated in FIG. 2B, the access point may note that after receiving the packet 242b (N+4), the next received packet, the packet 245b, may include a sequence number (N+7) that indicates that a gap exists. In these and other implementations, the access point may recognize that the gap in the sequence begins within a time window identified as corresponding to the multi-user communication frame 211b. Additionally or alternatively, the packet 242b may indicate that it is the last packet in the multi-user communication frame 210b. In these and other implementations, the number of packets dropped may be identified (e.g., by identifying the size of the gap 220b), and the entire gap 220b may be attributed as error packets associated with the second multi-user communication frame 211b. For example, because there was no packet received indicating the start of the second multi-user communication frame 211b (e.g., the packet 243b was not received) and the gap 220b occurs during the time frame designated as belonging to the second multi-user communication frame 211b, all of the packets in the gap 220b may be attributed to the second multi-user communication frame 211b in determining the multi-user packet error rate.

As illustrated by the inclusion of FIGS. 2A and 2B, regardless of whether a preceding set of received packets is a set of single user or generic multi-user packets, or whether the preceding set of received packets is a multi-user communication frame, the determination of and attribution of the gaps 220a and 220b are similarly determined and similarly applied to the multi-user communication frame 211a/211b respectively. Additionally, an example description of the flow of operations associated with the circumstances 200a and/or 200b illustrated in FIGS. 2A and/or 2B may be illustrated in FIG. 5.

Figure 2C:
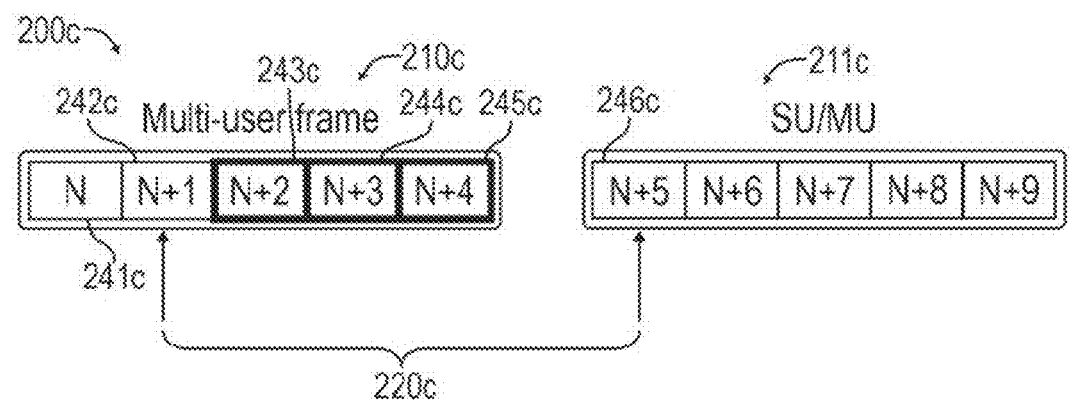

FIG. 2C illustrates a circumstance 200c in which a first set of packets is communicated as a multi-user communication frame 210c, with a first packet 241c and one or more additional packets 242c. The circumstance 200c also include a second set of packets 211c as a PDU of either single user or generic multi-user communicated packets with an initial packet 246c. In some implementations, the packet 246c may include an indication that the packet 246c is the initial packet of the second set of packets 211c. As illustrated in FIG. 2C, a gap 220c of dropped packets may exist that includes packets 243c, 244c, and 245a.

In operation, an access point or other host device may monitor a sequence number of received packets. For example, as illustrated in FIG. 2C, the access point may note that after receiving the packet 242c (N+1), the next received packet, the packet 246c, may include a sequence number (N+5) that indicates that the gap 220c exists. In these and other implementations, the access point may recognize that the gap 220c in the sequence begins after the initial packet 241c of the multi-user communication frame 210c, and that the first packet received after the gap 220c indicates the beginning of the second set of packets 211c. In these and other implementations, the number of packets dropped may be identified (e.g., by identifying the size of the gap 220c), and the entire gap 220c may be attributed as error packets associated with the multi-user communication frame 210c. For example, because the packet 241c indicates the start of the multi-user communication frame 210c and the first packet received after the gap (the packet 246c) indicates the start of the second set of packets 211c, it can be assumed that the missing packets are from the end of the multi-user communication frame 210c. As such, all of the packets in the gap 220c may be attributed to the multi-user communication frame 210c in determining the multi-user packet error rate.

Figure 2D:
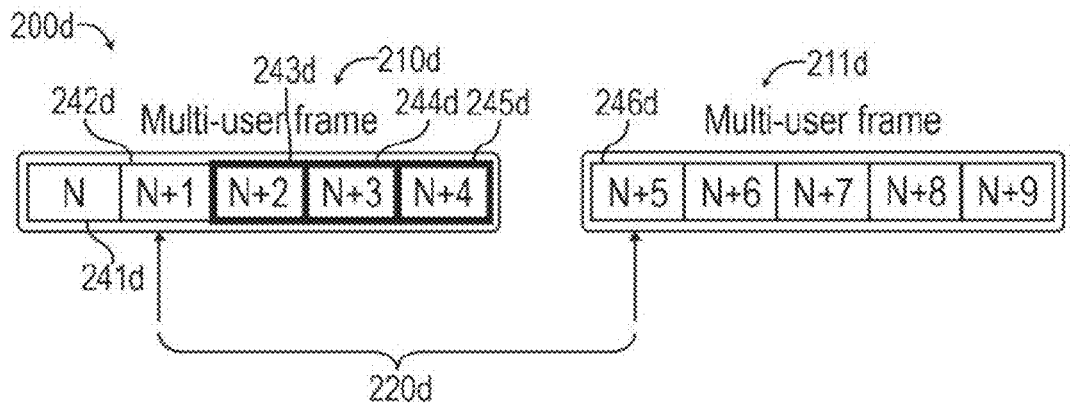

FIG. 2D illustrates a circumstance 200d in which a first set of packets is communicated as a first multi-user communication frame 210d, with a first packet 241d and one or more additional packets 242d. The circumstance 200d also includes a second set of packets as a second multi-user communication frame 211d with an initial packet 246c. In some implementations, the packet 246c may include an indication that the packet 246c is the initial packet of the second multi-user communication frame 211d. As illustrated in FIG. 2D, a gap 220d of dropped packets may exist that includes packets 243d, 244d, and 245d.

In operation, an access point or other host device may monitor a sequence number of received packets. For example, as illustrated in FIG. 2D, the access point may note that after receiving the packet 242d (N+1), the next received packet, the packet 246d, may include a sequence number (N+5) that indicates that the gap 220d exists. In these and other implementations, the access point may recognize that the gap 220d in the sequence begins after the initial packet 241d of the first multi-user communication frame 210d, and that the first packet received after the gap 220d indicates the beginning of the second multi-user communication frame 211d. In these and other implementations, the number of packets dropped may be identified (e.g., by identifying the size of the gap 220d), and the entire gap 220d may be attributed as error packets associated with the first multi-user communication frame 210d. For example, because the packet 241d indicates the start of the first multi-user communication frame 210d and the first packet received after the gap (the packet 246d) indicates the start of the second multi-user communication frame 211d, it can be assumed that the missing packets are from the end of the first multi-user communication frame 210d. As such, all of the packets in the gap 220d may be attributed to the first multi-user communication frame 210d in determining the multi-user packet error rate.

As illustrated by the inclusion of FIGS. 2C and 2D, regardless of whether a following set of received packets is a set of single user or generic multi-user packets, or whether the following set of received packets is a multi-user communication frame, the determination of and attribution of the gaps 220c and 220d are similarly determined and similarly applied to the multi-user communication frame 210c/210d respectively. Additionally, an example description of the flow of operations associated with the circumstances 200c and/or 200d illustrated in FIGS. 2C and/or 2D may be illustrated in FIG. 6.

Figure 2E:
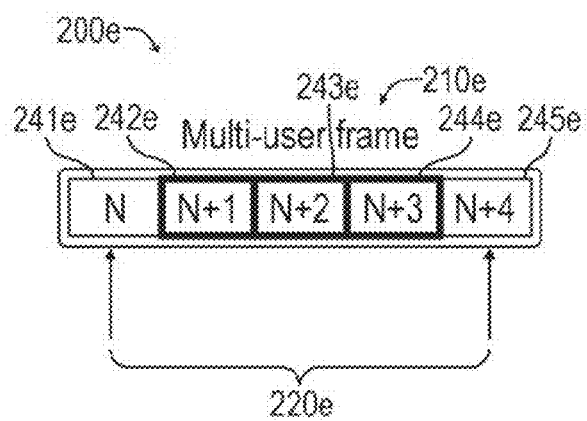

FIG. 2E illustrates a circumstance 200e in which a set of packets is communicated as a multi-user communication frame 210e, with a first packet 241e and a final packet 245e of the multi-user communication frame 210e. In some implementations, the packet 241e may include an indication that the packet 241e is the initial packet of the multi-user communication frame 210e. As illustrated in FIG. 2E, a gap 220e of dropped packets may exist that includes packets 242e, 243e, and 244e.

In operation, an access point or other host device may monitor a sequence number of received packets. For example, as illustrated in FIG. 2E, the access point may note that after receiving the packet 241e (N), the next received packet, the packet 245e, may include a sequence number (N+4) that indicates that the gap 220e exists. In these and other implementations, the access point may recognize that the gap 220e in the sequence begins after the initial packet 241e of the first multi-user communication frame 210e, and that the next received packet is still within the time frame of the multi-user communication frame 210e (and/or some other indication that the packet 245e is part of the multi-user communication frame 210e). In these and other implementations, the number of packets dropped may be identified (e.g., by identifying the size of the gap 220e), and the entire gap 220e may be attributed as error packets associated with the multi-user communication frame 210e. For example, because the packet 241e indicates the start of the multi-user communication frame 210e and the first packet received after the gap (the packet 245e) is still part of the multi-user communication frame 210e, it can be assumed that the missing packets are from within the multi-user communication frame 210e. As such, all of the packets in the gap 220e may be attributable to the multi-user communication frame 210e in determining the multi-user packet error rate. An example description of the flow of operations associated with the circumstance 200e illustrated in FIG. 2E may be illustrated in FIG. 7.

Figure 2F:
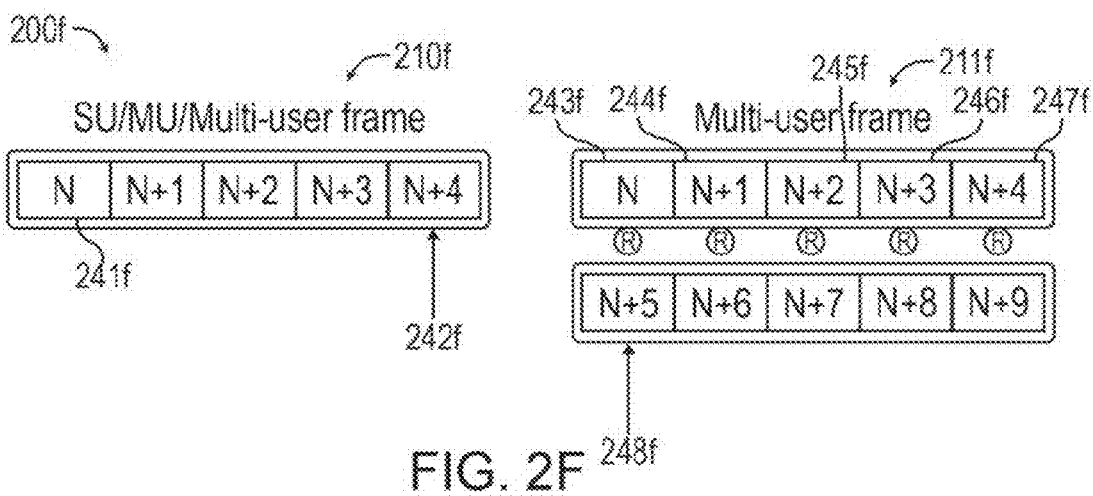

FIG. 2F illustrates a circumstance 200f in which an initial set of packets 210f is communicated (as single-user uplink transmissions or generically from multiple users in uplink transmissions, or a multi-user communication frame), with a first packet 241f and a final packet 242f. The circumstance 200f additionally includes a second set of packets communicated as part of a multi-user communication frame 211f with packets 243f, 244f, 245f, 246f and 247f. As illustrated by the sequence numbers, the packets 243f-247f may be the same packets as were included in the initial set of packets 210f. The multi-user communication frame 211f may also include a third set of packets with an initial packet 248f.

In operation, an access point or other host device may monitor a sequence number of received packets. For example, as illustrated in FIG. 2F, the access point may recognize that the data received in the multi-user communication frame 211f includes a series of packets with the same sequence numbers as in the first set of packets 210f. In these and other implementations, the access point may recognize that the packets received in duplicate (e.g., the packets 243f-247f) may indicate that there was an error in the station receiving the acknowledgment back from the access point. In these and other implementations, the number of packets received in duplicate (e.g., the packets 243f-247f) may be attributed as error packets associated with the multi-user communication frame 211f. In some implementations, the packets received in duplicate (e.g., the packets 243f-247f) may be marked with a retry flag, a retransmit flag, or other identifier indicating that they are being sent an additional time because the packets were not received by the access point. As such, all of the packets with the retransmit flag and/or received in duplicate may be attributed to the multi-user communication frame 211f in determining the multi-user packet error rate. An example description of the flow of operations associated with the circumstance 200f illustrated in FIG. 2F may be illustrated in FIG. 8.

Figure 2G:
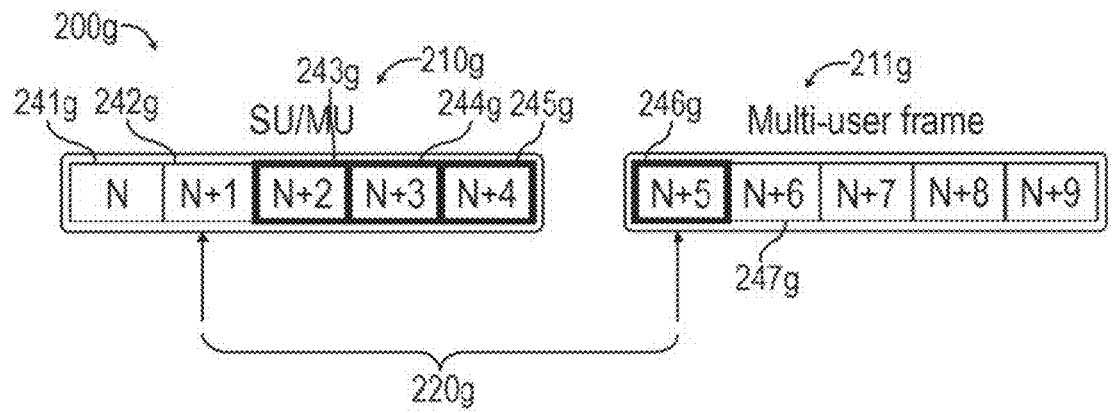

FIG. 2G illustrates a circumstance 200g in which a first set of packets 210g is communicated as a PDU of either single user or generic multi-user communicated packets with an initial packet 241g and one or more additional packets 242g, and packets 243g-245g which are not received. The circumstance 200g also includes a second set of packets as a multi-user communication frame 211g with an initial packet 246g (which is not received) and a first received packet 247g (which is received). As illustrated in FIG. 2G, a gap 220g of dropped packets may exist that includes packets 243g, 244g, 245g, and 246g.

In operation, an access point or other host device may monitor a sequence number of received packets. For example, as illustrated in FIG. 2G, the access point may note that after receiving the packet 242g (N+1), the next received packet, the packet 247g, may include a sequence number (N+6) that indicates that the gap 220g exists. In these and other implementations, the access point may recognize that the gap 220g in the sequence begins after the initial packet 241g of the first set of packets 210g, and that the first packet received after the gap 220g is part of the multi-user communication frame 211g. For example, the packet 247g may include a tag or flag indicating it is part of the multi-user communication frame 211g, or may be received in a time window designated as associated with the multi-user communication frame 211g. In these and other implementations, the number of packets dropped may be identified (e.g., by identifying the size of the gap 220g), and the entire gap 220g may be attributed as error packets that are not associated with the multi-user communication frame 211g. For example, because the packet 241g indicates the start of the first set of packets 210g, and the first packet received after the gap (the packet 247g) does not indicate the start of the multi-user communication frame 211g while still being part of the multi-user communication frame 211g, it may be assumed that the missing packets are from the end of the initial set of packets 210g. As such, none of the packets in the gap 220g may be attributed to the multi-user communication frame 211g in determining the multi-user packet error rate. In some implementations, it may be assumed that at least one of the lost packets is attributable to the multi-user communication frame 211g as a packet was not received that includes an indication of the start of the multi-user communication frame 211g (e.g., the packet 246g was not received). In these and other implementations, one packet of the gap 220g may be attributable to the multi-user communication frame 211g (corresponding to the packet that is expected to include the indication of the start of the multi-user communication frame 211g that was not received) and the remainder of the packets of the gap 220g may not be attributable to the multi-user communication frame 211g. An example description of the flow of operations associated with the circumstance 200g illustrated in FIG. 2G may be illustrated in FIG. 9.

Figure 2H:
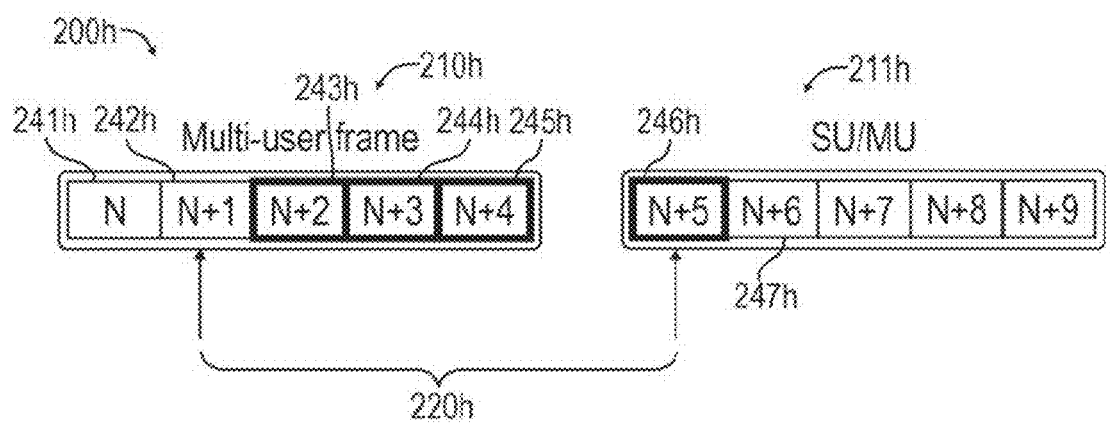

FIG. 2H illustrates a circumstance 200h in which a first set of packets is communicated as a multi-user communication frame 210h including an initial packet 241h, one or more additional packets 242h, and/or one or more packets 243h, 244h, and/or 245h which are not received. The circumstance 200g also includes a second set of packets 211h transmitted as a PDU of single-user uplink transmissions or generically from multiple users in uplink transmissions with an initial packet 246h (which is not received) and a first received packet 247h (which is received). As illustrated in FIG. 2H, a gap 220h of dropped packets may exist that includes packets 243h, 244h, 245h, and 246h.

In operation, an access point or other host device may monitor a sequence number of received packets. For example, as illustrated in FIG. 2H, the access point may note that after receiving the packet 242h (N+1), the next received packet, the packet 247h, may include a sequence number (N+6) that indicates that the gap 220h exists. In these and other implementations, the access point may recognize that the gap 220h in the sequence begins after the initial packet 241h of the multi-user communication frame 210h, and that the first packet received after the gap 220h is part of the second set of packets 211h. For example, the packet 247h may include a tag or flag indicating it is part of a single user PDU, or may be received in a time window outside of that designated as associated with the multi-user communication frame 210h. In these and other implementations, the number of packets dropped may be identified (e.g., by identifying the size of the gap 220h), and the entire gap 220h may be attributed as error packets that are associated with the multi-user communication frame 210h. For example, because the packet 241h indicates the start of the multi-user communication frame 210h, and the first packet received after the gap (the packet 247h) does not indicate the start of the second set of packets 211h and is also not part of the multi-user communication frame 210h, it may be assumed that the missing packets are from the end of the multi-user communication frame 210h. As such, all of the packets in the gap 220h may be attributed to the multi-user communication frame 210h in determining the multi-user packet error rate. In some implementations, it may be assumed that at least one of the lost packets is attributable to the second set of packets 211h as a packet was not received that includes an indication of the start of the second set of packets 211h (e.g., the packet 246h was not received). In these and other implementations, one packet of the gap 220h may not be attributable to the multi-user communication frame 210h (corresponding to the packet that is expected to include the indication of the start of the second set of packets 211h that was not received) and the remainder of the packets of the gap 220h may be attributable to the multi-user communication frame 210h. An example description of the flow of operations associated with the circumstance 200h illustrated in FIG. 2H may be illustrated in FIG. 10.

Figure 3C:
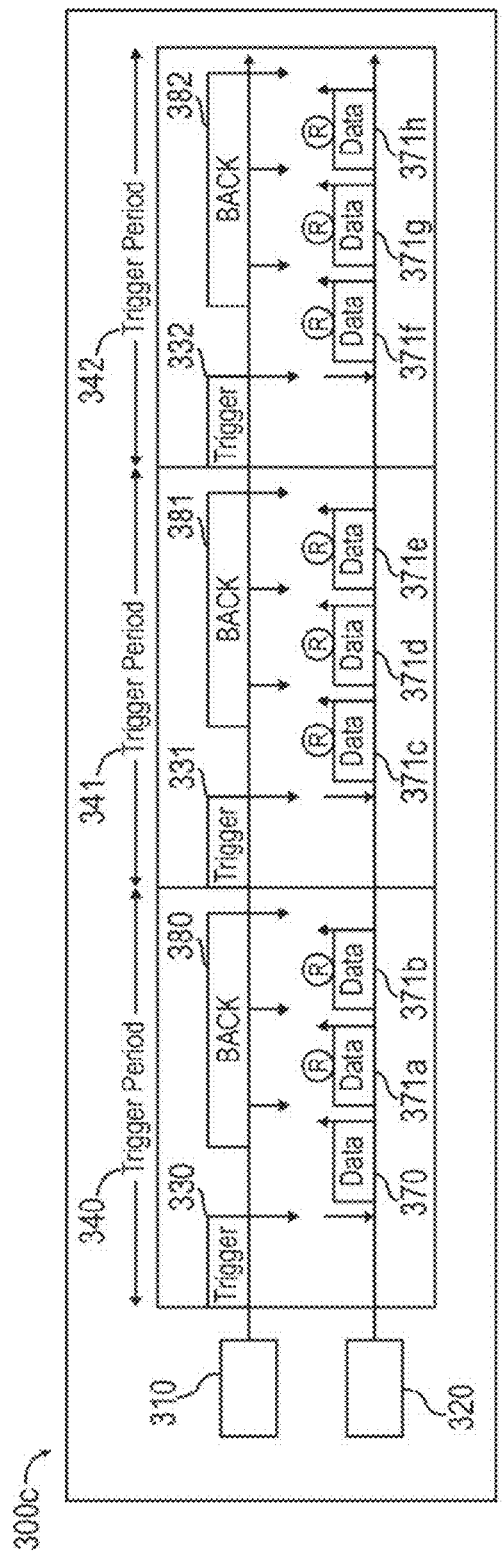

FIGS. 3A-3C illustrate a series of communications between a client device and a host device in various circumstances 300a-300c, described according to at least one implementation of the present disclosure. FIGS. 3A-3C illustrate the circumstances 300a-300c in which a host device 310 is in communication with a client device 320. The host device 310 sends triggers 330, 331, and 332 with corresponding trigger periods 340, 341, and 342, respectively.

FIG. 3A illustrates the circumstance 300a in which the trigger 330 is sent by the host device 310 and an error 350 occurs where the trigger 330 is not received by the client device 320 (and similar errors 351 and 352 occur such that the triggers 331 and 332 are likewise not received). In the circumstance 300a, the client device 320 never receives the trigger 330, and no data is sent via the uplink multi-user communication frame during the trigger period 340. In these and other implementations in which no data is received during the trigger period 340, an assumption may be made of the number of packets to include as attributable to the multi-user packet error rate. For example, a size of a previous multi-user communication frame (e.g., the number of packets in the previous multi-user communication frame) may be used as the number of packets to include as attributable to the multi-user packet error rate. As another example, the number of packets to include as attributable to the multi-user packet error rate may be abstracted from historical statistics, such as the average or the previous single/multi-user communication frame, a rolling average of previous multi-user communication frames, a rolling average with a decay aspect such that more recent values are more impactful than older values, combinations thereof, etc.

FIG. 3B illustrates the circumstance 300b in which the trigger 330 is sent by the host device 310, and data 360, 361, and 362 are sent during the trigger periods 340, 341, and 342, respectively. Errors 365, 366, and 367 occur preventing the host device 310 from receiving the data 360, 361, and 362, respectively, from the client device 320. Just as with the circumstance 300a of FIG. 3A, no data is received by the host device 310 during the trigger periods 340, 341, and 342, although being caused by a different error. In these and other implementations in which no data is received during the trigger period 340, an assumption may be made of the number of packets to include as attributable to the multi-user packet error rate. For example, a size of a previous multi-user communication frame (e.g., the number of packets in the previous multi-user communication frame) may be used as the number of packets to include as attributable to the multi-user packet error rate.

As illustrated by the inclusion of FIGS. 3A and 3B, regardless of whether the error 350/351/352 occurs to prevent the client device 320 from receiving the trigger or the error 365/366/367 occurs to prevent the host device 310 from receiving the data 360/361/362, the determination of and attribution of the number of packets to a multi-user communication frame are similarly determined and similarly applied to the multi-user packet error rate. For example, the absence of data received by the host device 310 may cause the host device to act as though an entire multi-user communication frame similar in size to a previous multi-user communication frame is lost. Additionally, an example description of the flow of operations associated with the circumstances 300a and/or 300b illustrated in FIGS. 3A and/or 3B may be illustrated in FIG. 11.

FIG. 3C illustrates the circumstance 300c in which the trigger 330 is sent by the host device 310, and data 370, and duplicate/retried data 371a and 371b are sent in response, with a block acknowledgment 380 and/or other acknowledgment signal sent from the host device 310 back to the client device 320. The duplicate/retried data 371a and 371b may include a retransmit or retry flag, or other indication that the data 371a and/or 371b is being sent an additional time. In these and other implementations, the host device 310 may treat retried data as being attributable to the error rate of the multi-user communication frame. For example, an error may occur in the client device 320 receiving the block acknowledgment 380 or in processing the block acknowledgment 380. In these and other implementations, each time the data is received in duplicate (e.g., the data 371a and the data 371b) the host device 310 may increase the packets attributable to the multi-user packet error rate by the number of packets in the data 371a. For example, if the data 370 includes three packets, and is sent in duplicate with a retransmit or retry flag in the data 371a and 371b, the packets attributable to the multi-user packet error rate may be increased by three when the data 371a is received and by three again when the data 371b is received. Such an increase may occur each time the data is received, even if in a later multi-user communication frame. Continuing the example from above, the packets attributable to the multi-user packet error rate may be increased by three each time the data 371c, 371d, 371e, 371f, 371g, and/or 371h are received. For example, the host device 310 may assume that an error occurred in receiving or processing the block acknowledgment 380, 381, and/or 382, which may cause the client device 320 to retransmit the same data repeatedly. By counting such data towards the multi-user packet error rate, the rate for future uplink transmissions from the client device 320 to the host device 310 may be reduced and thereby the client device 320 may be more likely to properly receive and/or process the block acknowledgment 380, 381, and/or 382.

In some implementations, in response to the circumstance 300c (e.g., the host device 310 repeatedly receives retry data), the host device 310 may adjust the rate at which the host device 310 transmits the block acknowledgment 380, 381, and/or 382. For example, based on receiving the data 371a and/or 371b, the host device 310 may decrease the rate at which the block acknowledgment 381 is transmitted to increase the likelihood of the client device 320 receiving and/or properly processing the block acknowledgment 381.

Modifications, additions, or omissions may be made to the circumstances 200a-200h and/or 300a-300c and/or the responses thereto without departing from the scope of the present disclosure. For example, any number of packets may be included within the gaps 230 illustrated in FIGS. 2A-2H and/or in the regions of received packets in the PDUs and/or the multi-user communication frames.

Figure 4:
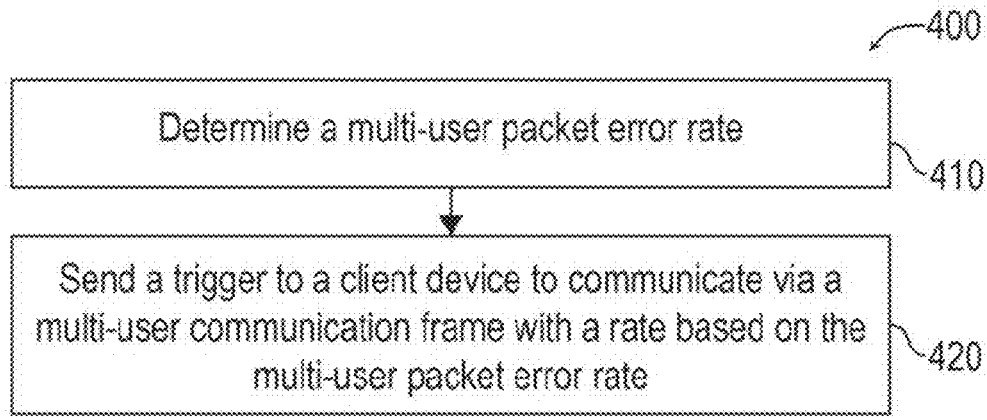
FIG. 4 illustrates a flowchart of an example method of determining and utilizing a packet error rate, described according to at least one implementation of the present disclosure.

FIG. 4 illustrates a flowchart of an example method 400 of determining and utilizing a packet error rate, described according to at least one implementation of the present disclosure.

At block 410, a multi-user packet error rate may be determined. For example, a host device, such as an access point, may determine a number of packets which include an error condition and are attributable to a multi-user communication frame, such as an OFDMA frame. The error rate may be based on a ratio of the number of packets with an error condition to the total number of packets expected to be received. A variety of circumstances and/or conditions may result in packets in an error condition (e.g., being dropped) being attributed to the multi-user communication frame and thus included in determining the multi-user packet error rate, such as those illustrated in FIGS. 2A-2H and/or 3A-3C.

At block 420, a trigger may be sent to a client device to instruct the client device to communicate with the host device via a multi-user communication frame with a rate based on the multi-user packet error rate. For example, the host device may adjust the rate identified in the trigger to a higher rate as compared to a previous rate communicated in a previous trigger if there is a low multi-user packet error rate. As another example, the host device may adjust the rate identified in the trigger to a lower rate as compared to a previous rate if there is a high multi-user packet error rate. In some implementations, the trigger may identify a window of time within which the client device is to transmit data to the host device. In these and other implementation, the client device may respond to the trigger by transmitting data in the uplink direction to the host device in a multi-user communication frame (such as an UL OFDMA frame) and at the updated rate identified in the trigger.

FIGS. 5-11 illustrate various flowcharts of example methods of determining a packet error rate in various circumstances, described according to at least one implementation of the present disclosure. For example, the methods illustrated in FIGS. 5-11 and/or combinations thereof may be examples of implementations of the block 410 of FIG. 4.

Figure 5:
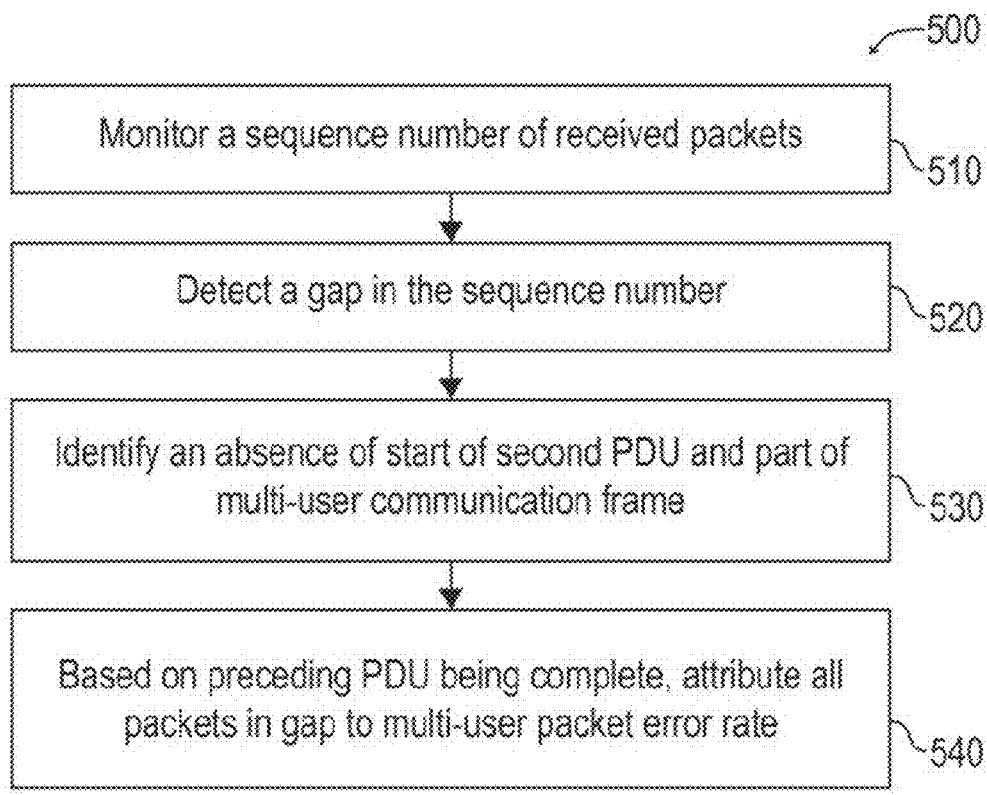
FIGS. 5-11 illustrate various flowcharts of example methods of determining a packet error rate in various circumstances, described according to at least one implementation of the present disclosure.

As illustrated in FIG. 5 for method 500, at block 510, a sequence number of received packets may be monitored by a host device. For example, the host device may store a sequence number of the most recently received packet such that the next received packet may be compared to the most recent previously received packet.

At block 520, a gap in the sequence numbers may be detected. For example, the host device may identify that the must recently received packet has a sequence number that is more than one sequence number higher than the previously received packet.

At block 530, an absence of a start of a second protocol data unit (PDU) may be observed in the packet received after the gap (e.g., the most recently received packet). For example, the host device may identify that the packet received after the gap in sequence numbers does not include a flag, tag, or other identifier indicating that the packet is a start of a PDU. Additionally or alternatively, the most recently received packet may be identified as being part of a multi-user communication frame. For example, the most recently received packet (e.g., the first packet after the gap detected at block 520) may indicate that the packet is part of the multi-user communication frame. As another example, the most recently received packet may be received during a time window identified by a trigger as belonging to the multi-user communication frame.

At block 540, based on the preceding PDU being complete, the packet received after the gap not starting a new PDU, and the packet received after the gap being part of the multi-user communication frame, all packets of the gap may be attributable to the multi-user communication frame and be counted towards the multi-user packet error rate. For example, all the packets of the gap may be counted by the host device as being applicable to both a total number of expected packets as well as being applicable to packets with an error attributable to the multi-user communication frame.

Figure 6:
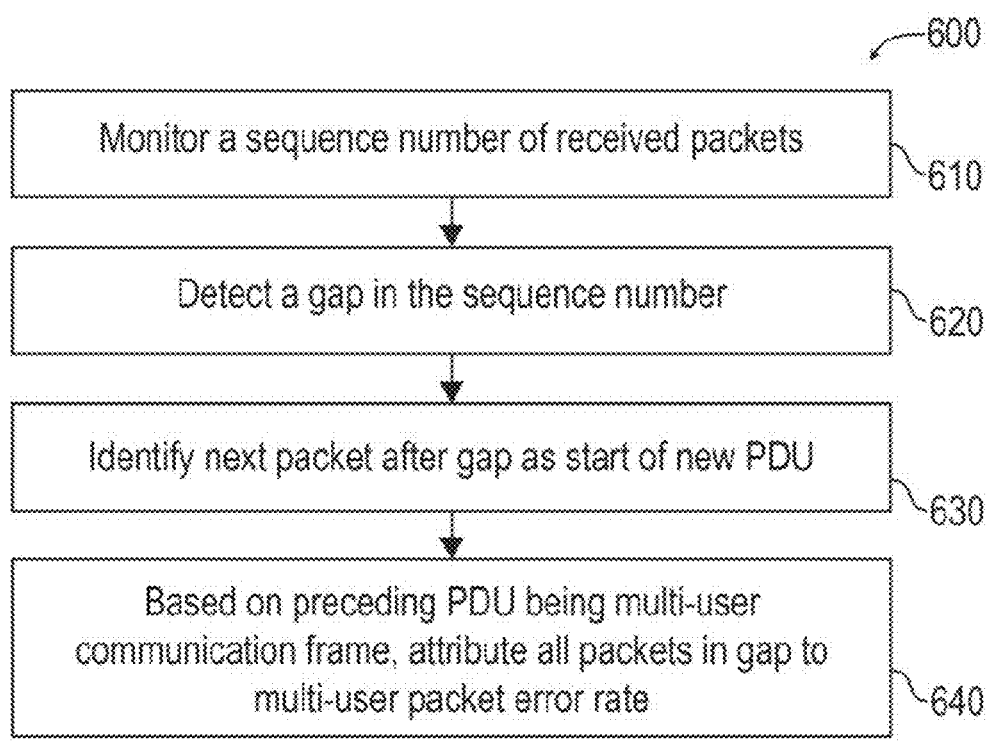

As illustrated in FIG. 6 for method 600, at block 610, a sequence number of received packets may be monitored by a host device. The block 610 may be similar or comparable to the block 510 of FIG. 5.

At block 620, a gap in the sequence numbers may be detected. The block 620 may be similar or comparable to the block 520 of FIG. 5.

At block 630, the next packet received after the identified gap may be identified as starting a new PDU. For example, the packet received after the gap may include a flag, tag, or other identifier indicating that the packet received after the gap starts the new PDU.

At block 640, based on the preceding PDU being a multi-user communication frame and the next packet after the gap starting a new PDU, all packets of the gap may be attributable to the multi-user communication frame of the previous PDU and be counted towards the multi-user packet error rate.

Figure 7:
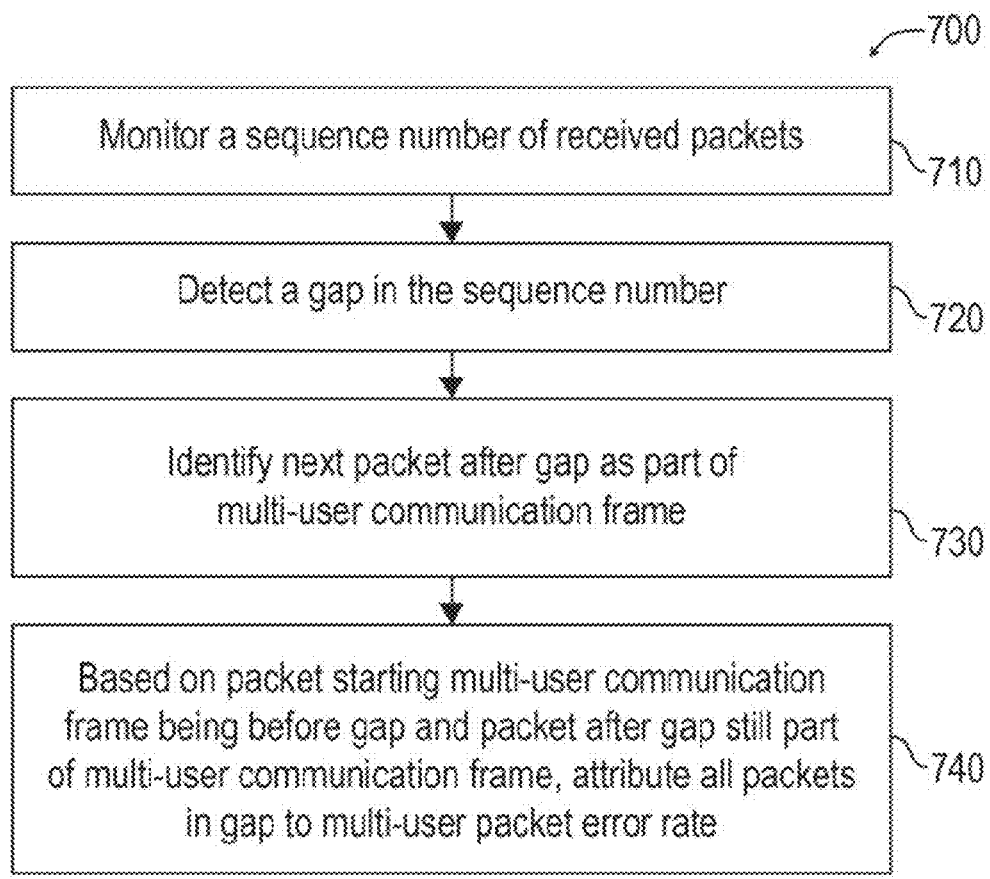

As illustrated in FIG. 7 for method 700, at block 710, a sequence number of received packets may be monitored by a host device. The block 710 may be similar or comparable to the block 510 of FIG. 5.

At block 720, a gap in the sequence numbers may be detected. The block 720 may be similar or comparable to the block 520 of FIG. 5.

At block 730, a next packet after the gap may be identified as being part of a multi-user communication frame. For example, the next packet after the gap may be received during a time window associated with the multi-user communication frame. As another example, the next packet after the gap may be identified by the host device as including a flag or tag indicating that the packet is a part of the multi-user communication frame.

At block 740, based on a packet starting the multi-user communication frame being before the gap and the packet immediately after the gap still being part of the multi-user communication frame, all packets in the gap may be attributable to the multi-user communication frame and be counted towards the multi-user packet error rate. In some implementations, the packet starting the multi-user communication frame may be received immediately preceding the gap. Additionally or alternatively, one or more packets may be received after the packet starting the multi-user communication frame and before the gap begins.

Figure 8:
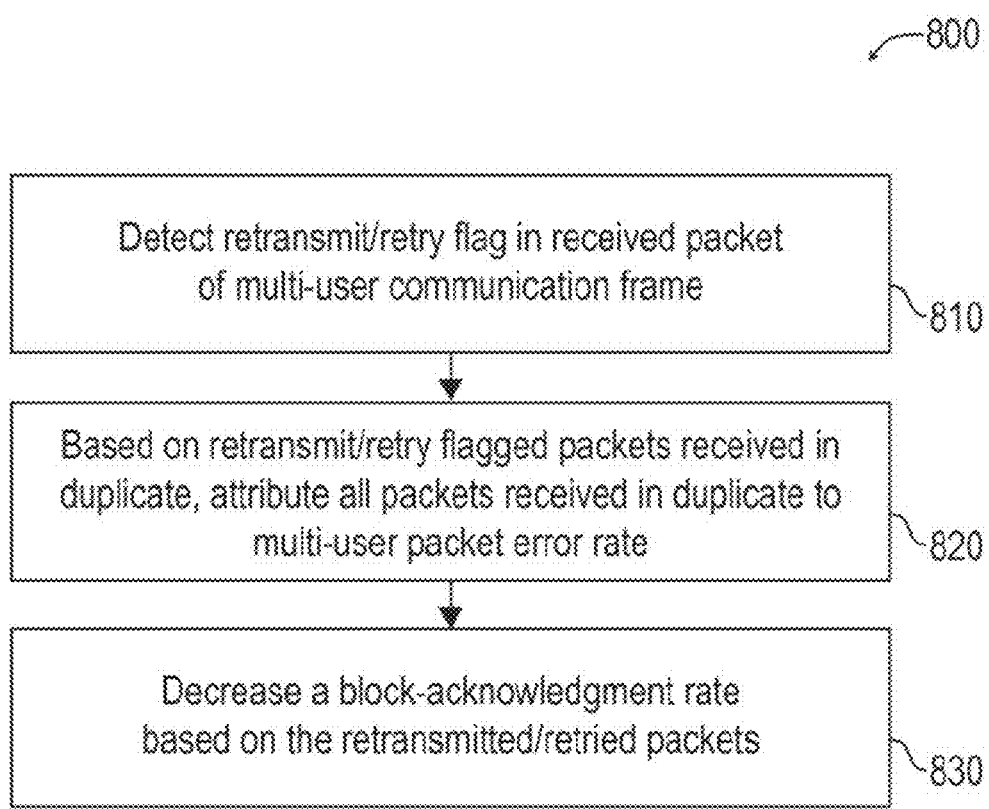

As illustrated in FIG. 8 for method 800, at block 810, a retransmit/retry flag may be detected in a received packet of a multi-user communication frame. For example, a packet may include an indicator that the packet is being sent a second time (or multiple times) because no corresponding acknowledgment was received by the client device sending the packets to the host device.

At block 820, based on the retransmit/retry flagged packets being received in duplicate, attributing all packets received in duplicate to the multi-user communication frame and being counted towards the multi-user packet error rate. In these and other implementations, the host device may identify packets received with a retransmit/retry flag which were already received and may count the second instance of the packets (e.g., those with the retransmit/retry flag despite already having been received) as attributable to the multi-user packet error rate.

At block 830, a block acknowledgment rate may be decreased based on the retransmitted/retried packets. For example, a host device may optionally decrease the rate at which block acknowledgments may be sent based on the retried packets. In these and other implementations, the host device may monitor the multi-user packet error rate that is determined based on packets received in duplicate with the retransmit/retry flag, and based on the multi-user packet error rate exceeding a threshold, the rate may be decreased at which the block acknowledgment signal is sent from the host device to the client device.

Figure 9:
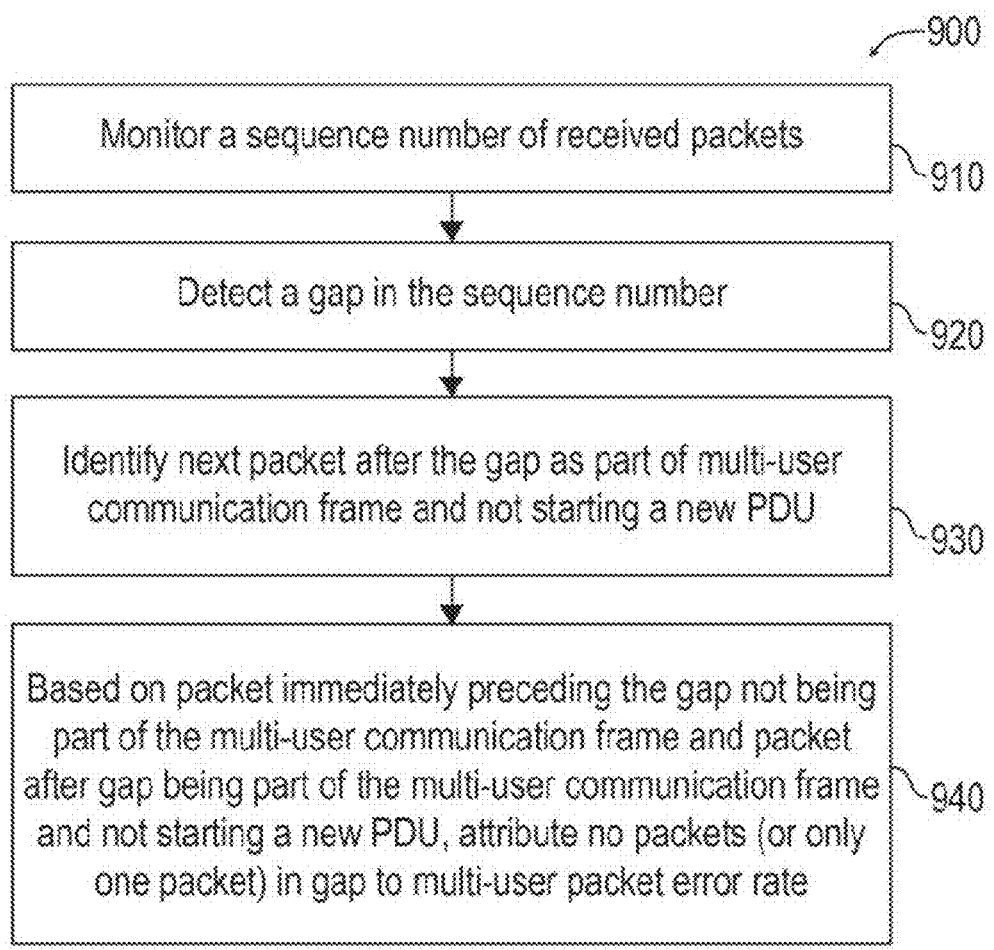

As illustrated in FIG. 9 for method 900, at block 910, a sequence number of received packets may be monitored by a host device. The block 910 may be similar or comparable to the block 510 of FIG. 5.

At block 920, a gap in the sequence numbers may be detected. The block 920 may be similar or comparable to the block 520 of FIG. 5.

At block 930, a next packet after the gap may be identified as part of a multi-user communication frame and not starting a new PDU. For example, the packet received immediately after the gap may be received during a time window associated with the multi-user communication frame. As another example, the packet received immediately after the gap may include an indicator or identifier indicating the packet is part of the multi-user communication frame. Additionally or alternatively, the packet may not include an identifier or flag indicating the packet starts a new PDU.

At block 940, based on the packet immediately preceding the gap not being part of the multi-user communication frame, and based on the packet immediately after the gap being part of the multi-user communication frame and not starting a new PDU, none of the packets from the gap may be attributed to the multi-user packet error rate. In some implementations, one of the packets (e.g., corresponding to the packet that would start the new PDU) of the gap, rather than none of the packets from the gap, may be attributable to the multi-user packet error rate.

Figure 10:
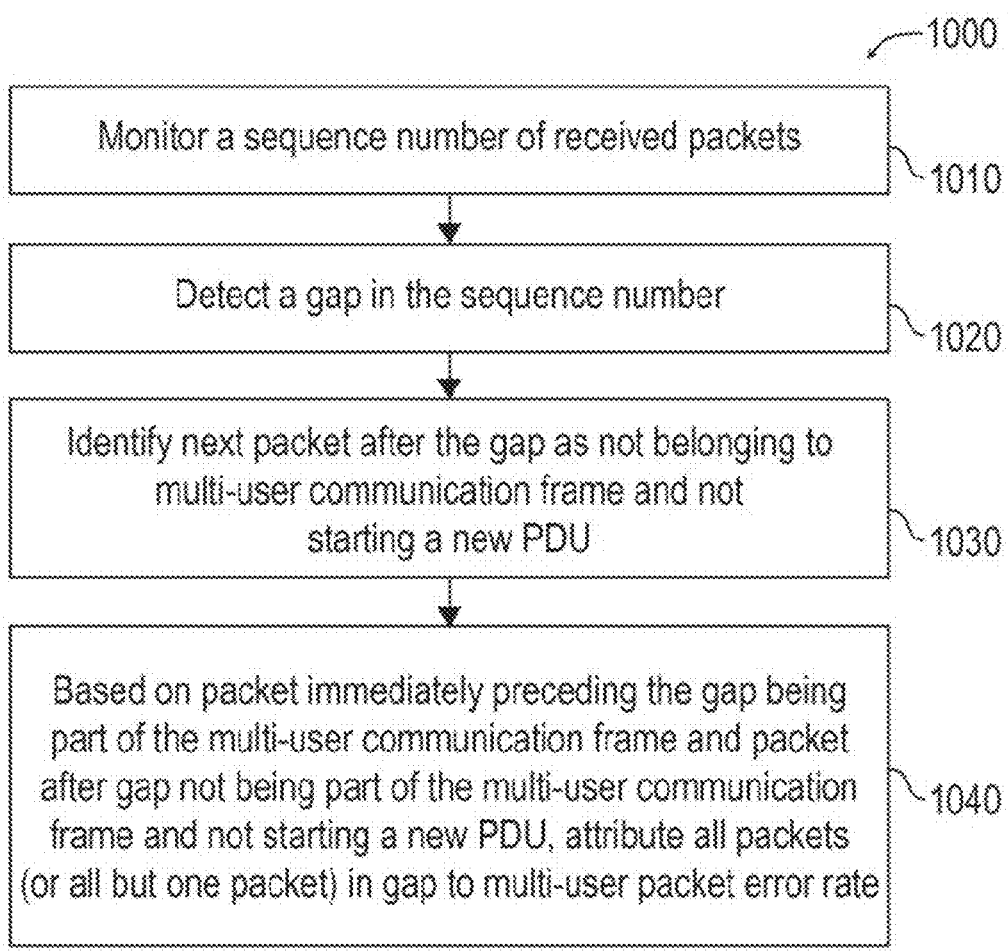

As illustrated in FIG. 10 for method 1000, at block 1010, a sequence number of received packets may be monitored by a host device. The block 1010 may be similar or comparable to the block 510 of FIG. 5.

At block 1020, a gap in the sequence numbers may be detected. The block 1020 may be similar or comparable to the block 520 of FIG. 5.

At block 1030, a next packet after the gap may be identified as not belonging to a multi-user communication frame and not starting a new PDU. For example, the packet received immediately after the gap may be received outside of a time window associated with the multi-user communication frame. As another example, the packet received immediately after the gap may not include an indicator or identifier indicating the packet is part of the multi-user communication frame. Additionally or alternatively, the packet may not include an identifier or flag indicating the packet starts a new PDU.

At block 1040, based on the packet immediately preceding the gap being part of the multi-user communication frame, and based on the packet immediately after the gap not being part of the multi-user communication frame and not starting a new PDU, all of the packets from the gap may be attributed to the multi-user packet error rate. In some implementations, all but one of the packets (e.g., corresponding to the packet that would start the new PDU) of the gap, rather than all of the packets from the gap, may be attributable to the multi-user packet error rate.

Figure 11:
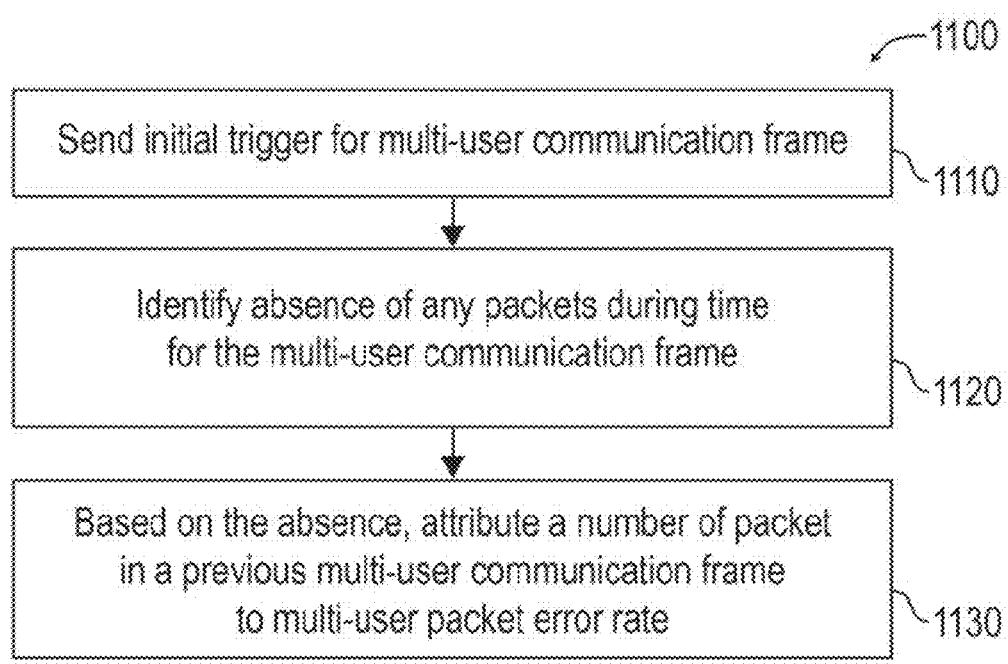

As illustrated in FIG. 11 for method 1100, at block 1110, an initial trigger may be sent from a host device to client devices for a multi-user communication frame. For example, the host device may broadcast the trigger for client devices to communicate with the host device in a designated window of time according to a designated rate. Such a multi-user communication frame may include an uplink (UL) OFDMA frame.

At block 1120, the host device may identify an absence of any packets being received during the window of time designated for the multi-user communication frame. For example, if an error occurred such that the client devices did not receive the trigger, or an error occurred in the transmission of data from the client device(s) to the host device, the host device may not receive any packets during the window of time designated for the multi-user communication frame.

At block 1130, based on the absence, a number of packets in a previous multi-user communication frame may be attributed to a multi-user packet error rate. For example, the host device may identify the most recently received multi-user communication frame and may increase the multi-user packet error rate by the number of packets in the most recently received multi-user communication frame. As another example, the host device may take an average number of packets in a set number of previously received multi-user communication frames (e.g., the 5 most recently received multi-user communication frames) as the size to attribute to the multi-user packet error rate. In some implementations, the host device may have a setting or preset configuration of a size to attribute to the multi-user packet error rate when no packets are received during the window of time designated for the multi-user communication frame.

Figure 12:
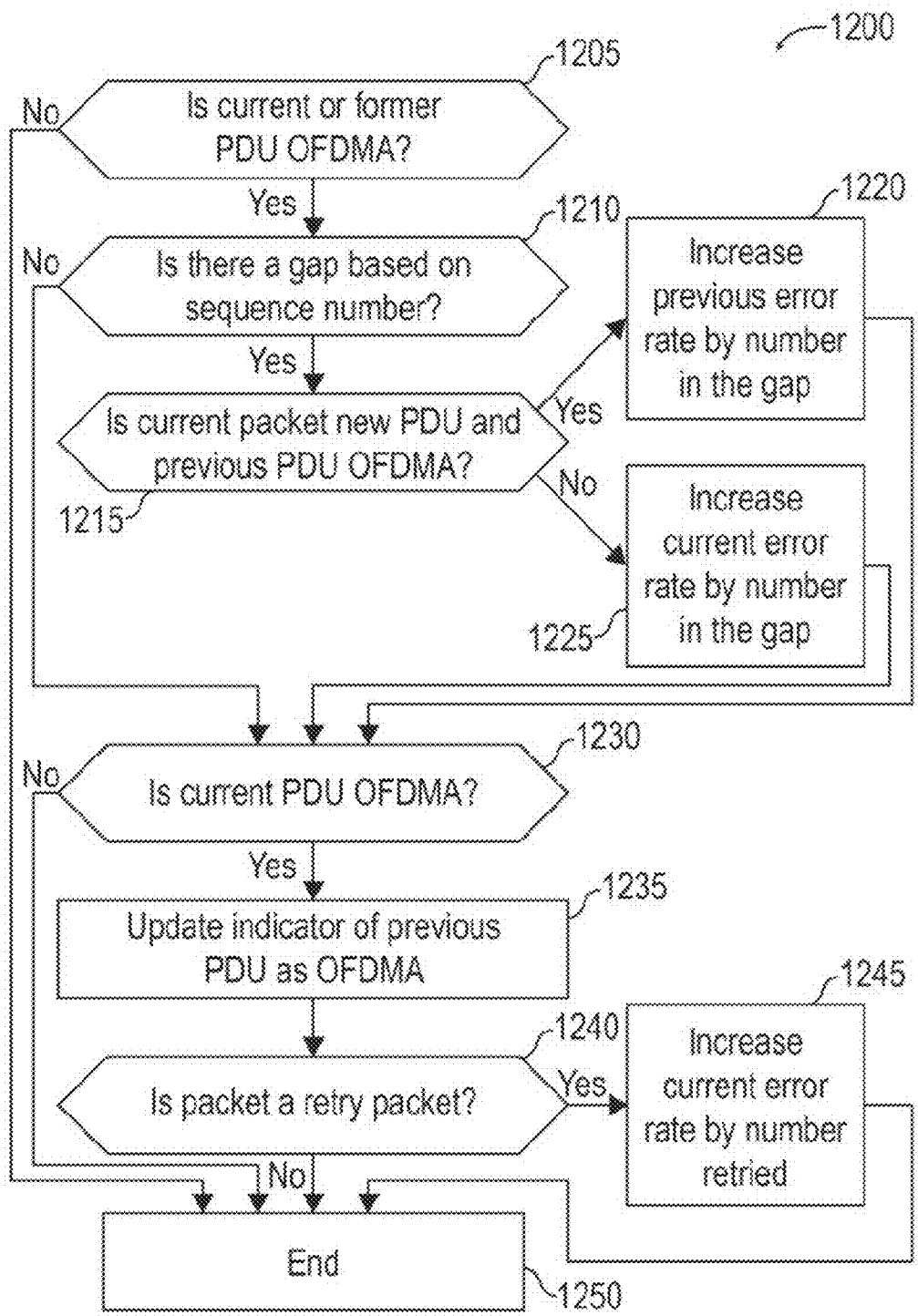
FIG. 12 illustrates a flowchart of an additional example method of determining a packet error rate, described according to at least one implementation of the present disclosure.

FIG. 12 illustrates a flowchart of an additional example method 1200 of determining a packet error rate, described according to at least one implementation of the present disclosure.

At block 1205, a determination may be made whether the current PDU or the immediately preceding PDU is an OFDMA frame. For example, a host device may determine whether or not the current or immediately preceding PDU is within a time window associated with an OFDMA frame. If the current PDU or the immediately preceding PDU is an OFDMA frame, the method 1200 may proceed to the block 1210. If the current PDU or the immediately preceding PDU is not an OFDMA frame, the method 1200 may proceed to the block 1250 to end the processing of the current packet.

At block 1210, a determination may be made whether or not there is a gap based on sequence numbers of received packets. For example, a host device may monitor the sequence number of received packets to determine if there is a gap in the sequence numbers of the received packets. If there is such a gap, the method 1200 may proceed to the block 1215. If there is no gap in the sequence numbers of the received packets, the method 1200 may proceed to the block 1230.

At block 1215, a determination may be made whether the current packet is a new PDU and the previous PDU is an OFDMA frame. If both conditions are true, the method 1200 may proceed to the block 1220. If either condition is not true (e.g., if the current packet is not a new PDU and/or the previous PDU is not an OFDMA frame), the method 1200 may proceed to the block 1225.

At block 1220, the multi-user packet error rate associated with the previous PDU may be increased by the number of packets in the gap. For example, the gap would fall in the last portion of the OFDMA frame as the current packet (the first packet after the gap) starts a new PDU and the previous PDU is the OFDMA frame.

At block 1225, the multi-user packet error rate associated with the current PDU (e.g., the OFDMA frame) may be increased by the number of packets in the gap.

At block 1230, a determination may be made whether the current PDU is an OFDMA frame. If the current PDU is an OFDMA frame, the method 1200 may proceed to the block 1235. If the current PDU is not an OFDMA frame, the method 1200 may proceed to the block 1250 to end the processing of the current packet.

At block 1235, an indicator associated with the previous PDU may be updated to indicate that the previous PDU is an OFDMA frame. For example, the host device may include a memory or other storage location that stores whether or not the previous PDU was an OFDMA frame. Based on the determination at the block 1230, the indicator may be updated (e.g., the current PDU is shifted to the previous PDU and identified as an OFDMA frame).

At block 1240, a determination may be made whether or not the current packet is a retry packet. For example, the host device may determine whether or not the current packet being processed includes a retry flag or other indicator that the packet is being sent a second time (or multiple times). If the current packet is a retry packet, the method 1200 may proceed to the block 1245. If the current packet is not a retry packet, the method 1200 may proceed to the block 1250 to end the processing of the current packet.

At block 1245, the current error rate may be increased by the number of retried packets. For example, in processing a single packet, the current error rate may be increased by one each time the current packet is a retried packet.

One skilled in the art will appreciate that, for these and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations. The methods 4-12 illustrated in FIGS. 4-12 may be performed in whole or in part by the AP 110 of FIG. 1.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1. A method includes determining a multi-user packet error rate associated with communications from a client device to a host device, the multi-user packet error rate based on a number of packets in a multi-user communication frame with an error; and sending a trigger from the host device to the client device to communicate via a second multi-user communication frame, the trigger identifying a transfer rate based on the multi-user packet error rate.

Example 2. An example host device includes one or more processors, and one or more non-transitory computer-readable media containing instructions that, when executed by the one or more processors, cause the host device to perform operations. The operations may include determining a multi-user packet error rate associated with communications from a client device to a host device, the multi-user packet error rate based on a number of packets in a multi-user communication frame with an error; and sending a trigger from the host device to the client device to communicate via a second multi-user communication frame, the trigger identifying a transfer rate based on the multi-user packet error rate.

Example 3. An example of determining a multi-user packet error rate consistent with one or more of the implementations of the present disclosure may include monitoring a received packet to determine whether or not the received packet or a previously received packet is part of an orthogonal frequency division multiple access (OFDMA) uplink transmission; monitoring a sequence number of the received packet to determine whether or not a gap in received packets exists prior to the received packet; and monitoring a received packet to determine whether or not the received packet is a retried packet, wherein the multi-user packet error rate is based on whether or not the received packet or the previously received packet is part of the OFDMA uplink transmission, whether or not the gap in received packets exists, and whether or not the received packet is a retried packet.

Example 4. An example of determining a multi-user packet error rate consistent with one or more of the implementations of the present disclosure may include monitoring a sequence number of received packets; detecting a gap in the sequence number of received packets; identifying an absence of a packet indicating a start of a second protocol data unit; and based on a first protocol data unit preceding the second protocol data unit being complete, attributing all packets in the gap to the multi-user packet error rate.

Example 5. An example of determining a multi-user packet error rate consistent with one or more of the implementations of the present disclosure may include monitoring a sequence number of received packets; detecting a gap in the sequence number of received packets; identifying a next packet after the gap as a start of a second protocol data unit; and based on a first protocol data unit preceding the second protocol data unit being the multi-user communication frame, attributing all packets in the gap to the multi-user packet error rate.

Example 6. An example of determining a multi-user packet error rate consistent with one or more of the implementations of the present disclosure may include monitoring a sequence number of received packets; detecting a gap in the sequence number of received packets; identifying a next packet after the gap as part of the multi-user communication frame and without data indicating a start of a new protocol data unit; and based on at least one packet preceding the gap starting the multi-user communication frame and the next packet after the gap being part of the multi-user communication frame, attributing all packets in the gap to the multi-user packet error rate.

Example 7. An example of determining a multi-user packet error rate consistent with one or more of the implementations of the present disclosure may include detecting a retransmit flag in a set of received packets of the multi-user communication frame; and based on the set of packets with the retransmit flag being received in duplicate, attributing all of the packets received in duplicate to the multi-user packet error rate.

Example 8. An example of determining a multi-user packet error rate consistent with one or more of the implementations of the present disclosure may include monitoring a sequence number of received packets; detecting a gap in the sequence number of received packets; identifying a next packet after the gap as belonging to the multi-user communication frame and without data indicating a start of a new protocol data unit; and based on a packet immediately preceding the gap not being part of the multi-user communication frame and the next packet after the gap being part of the multi-user communication frame and without data indicating a start of a new protocol data unit, attributing no packets in the gap to the multi-user packet error rate.

Example 9. An example of determining a multi-user packet error rate consistent with one or more of the implementations of the present disclosure may include monitoring a sequence number of received packets; detecting a gap in the sequence number of received packets; identifying a next packet after the gap as belonging to the multi-user communication frame and without data indicating a start of a new protocol data unit; and based on a packet immediately preceding the gap not being part of the multi-user communication frame and the next packet after the gap being part of the multi-user communication frame and without data indicating a start of a new protocol data unit, attributing only one packet in the gap to the multi-user packet error rate.

Example 10. An example of determining a multi-user packet error rate consistent with one or more of the implementations of the present disclosure may include monitoring a sequence number of received packets; detecting a gap in the sequence number of received packets; identifying a next packet after the gap as not belonging to the multi-user communication frame and without data indicating a start of a new protocol data unit; and based on a packet immediately preceding the gap being part of the multi-user communication frame and the next packet after the gap not being part of the multi-user communication frame and without data indicating a start of a new protocol data unit, attributing all packets except one in the gap to the multi-user packet error rate.

Example 11. An example of determining a multi-user packet error rate consistent with one or more of the implementations of the present disclosure may include sending an initial trigger from the host device to the client device to communicate via the multi-user communication frame; identifying an absence of any packets from the client device during a time indicated for the multi-user communication frame; and based on the absence of any packets from the client device during the time indicated for the multi-user communication frame, attributing a number of packets in a previous multi-user communication frame to the multi-user packet error rate.

Example 12. An example method consistent with one or more of the implementations of the present disclosure may further include detecting a triggering condition by the host device; and based on the triggering condition, shifting to a discovery mode in which the multi-user packet error rate is determined at an increased frequency compared to operation of the host device when outside of the discovery mode.

Example 13. An example method consistent with one or more of the implementations of the present disclosure such as example 12 may further include wherein the triggering condition includes one of a new client device communicatively coupling to the host device, and a complete failure in communication between the host device and the client device.

Example 14. An example method consistent with one or more of the implementations of the present disclosure such as example 12 may further include wherein the increased frequency of the discovery mode includes determining the multi-user packet error rate prior to sending each trigger.

Figure 13:
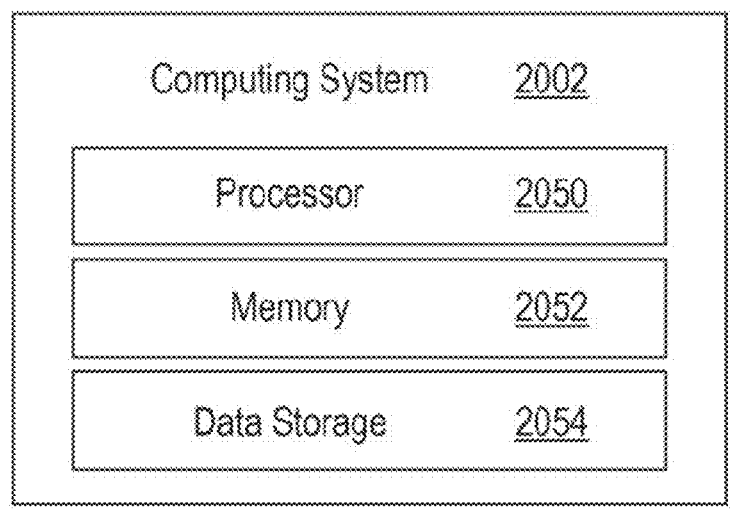
FIG. 13 illustrates a diagrammatic representation of a machine in the example form of a computing device, described according to at least one implementation of the present disclosure.

FIG. 13 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    determining a first packet error rate associated with a first communication at a first uplink rate from a client device to a host device;
    determining a second packet error rate associated with a second communication at a second uplink rate from the client device to the host device, wherein determining the second packet error rate comprises:
        sending an initial trigger from the host device to the client device;
        identifying an absence of any packets from the client device during a particular amount of time; and
        based on the absence of any packets from the client device during the particular amount of time, attributing a number of packets in a previous communication to the second packet error rate;
    determining that the second packet error rate is below a threshold error rate; and
    sending a trigger from the host device to the client device to communicate via the second uplink rate based on the second packet error rate being below the threshold error rate.

2. The method of claim 1, wherein determining the first packet error rate comprises:
    monitoring a sequence number of received packets;
    detecting a gap in the sequence number of received packets;
    identifying an absence of a packet indicating a start of a second protocol data unit; and
    based on a first protocol data unit preceding the second protocol data unit being complete, attributing all packets in the gap to the first packet error rate.

3. The method of claim 1, wherein the first communication includes one of: a single-user uplink transmission, a multi-user uplink transmission, or an orthogonal frequency division multiple access (OFDMA) uplink transmission.

4. The method of claim 1, wherein the second communication includes one of: a single-user uplink transmission, a multi-user uplink transmission, or an orthogonal frequency division multiple access (OFDMA) uplink transmission.

5. The method of claim 1, wherein the threshold error rate relates to an Institute of Electrical and Electronics Engineers (IEEE) 802.11 standard.

6. The method of claim 1, wherein the second packet error rate includes an uplink error rate.

7. A system, comprising:
one or more processors; and
one or more non-transitory computer readable media containing instructions that, when executed by the one or more processors, cause the system to perform one or more operations, the operations comprising:
determine a first packet error rate associated with a first communication at a first uplink rate from a client device to a host device;
determine a second packet error rate associated with a second communication at a second uplink rate from the client device to the host device, wherein the operation to determine the second packet error rate comprises:
send an initial trigger from the host device to the client device;
identify an absence of any packets from the client device during a particular amount of time; and
attribute, based on the absence of any packets from the client device during the particular amount of time, a number of packets in a previous communication to the second packet error rate;
determine that the second packet error rate is below a threshold error rate; and
send a trigger from the host device to the client device to communicate via the second uplink rate based on the second packet error rate being below the threshold error rate.

8. The system of claim 7, wherein the operation to determine the first packet error rate comprises:
monitor a sequence number of received packets;
detect a gap in the sequence number of received packets;
identify an absence of a packet indicating a start of a second protocol data unit; and
based on a first protocol data unit preceding the second protocol data unit being complete, attribute all packets in the gap to the first packet error rate.

9. The system of claim 7, wherein the first communication includes one of: a single-user uplink transmission, a multi-user uplink transmission, or an orthogonal frequency division multiple access (OFDMA) uplink transmission.

10. The system of claim 7, wherein the second communication includes one of: a single-user uplink transmission, a multi-user uplink transmission, or an orthogonal frequency division multiple access (OFDMA) uplink transmission.

11. The system of claim 7, wherein the threshold error rate relates to an Institute of Electrical and Electronics Engineers (IEEE) 802.11 standard.

12. The system of claim 7, wherein the second packet error rate includes an uplink error rate.

* * * * *